United States Patent [19]
Cantin et al.

[11] Patent Number: 5,729,739
[45] Date of Patent: Mar. 17, 1998

[54] PERSISTENT OBJECT MAPPING SYSTEM AND METHOD WITH ABSTRACT SCHEMA MAPPER

[75] Inventors: Guylaine Cantin, Toronto, Canada; George P. Copeland, Austin, Tex.; Ahmed M. Gheith, Round Rock, Tex.; Roger H. Sessions, Austin, Tex.

[73] Assignee: International Business Machines Corporation, Armonk, N.Y.

[21] Appl. No.: 569,550

[22] Filed: Dec. 8, 1995

Related U.S. Application Data

[63] Continuation of Ser. No. 234,434, Apr. 26, 1994, abandoned.
[51] Int. Cl.[6] ........................................ G06F 7/00
[52] U.S. Cl. ..................... 395/614; 395/683; 395/500
[58] Field of Search ............................ 395/613, 614, 395/683

[56] References Cited

U.S. PATENT DOCUMENTS

| | | | |
|---|---|---|---|
| 5,206,951 | 4/1993 | Khoyi et al. | 395/650 |
| 5,265,206 | 11/1993 | Shackelford et al. | 395/200 |
| 5,291,593 | 3/1994 | Abraham | 395/600 |
| 5,295,256 | 3/1994 | Bapat | 395/500 |
| 5,297,279 | 3/1994 | Bannon et al. | 395/600 |
| 5,303,375 | 4/1994 | Collins et al. | 395/650 |
| 5,398,336 | 3/1995 | Tantry et al. | 395/600 |
| 5,437,027 | 7/1995 | Bannon et al. | 395/614 |
| 5,613,099 | 3/1997 | Sessions et al. | 395/500 |
| 5,675,817 | 10/1997 | Waldo et al. | 395/614 |

OTHER PUBLICATIONS

"Organizing and Typing Persistent objects within an Object-Oriented Frame Work", Madany et al., IEEE, Jan., 1992, Sun Microsystem Lab.

Primary Examiner—Thomas G. Black
Assistant Examiner—Hosain T. Alam
Attorney, Agent, or Firm—Jeffrey S. LaBaw; Andrew J. Dillon

[57] ABSTRACT

A system for mapping data between a selected object and a persistent medium in an object-oriented computer system is disclosed, wherein the data is manipulated by processing methods associated with the object. The system selects a target to which the data is to be mapped and converts the data invoking to an environment type in which the data is to be mapped. The system further constructs a mapping method associated with the mapping request for mapping between the selected object and the persistent medium, where the method group consists of "store new", "store existing", "restore", and "delete". Further, a method is also disclosed for mapping a data structure between an object, which is in a class object, and a persistent medium in an object-oriented environment. The method includes receiving a request to map the data structure between the object and the persistent medium at the object. The request is sent from the identification object to the class object. A plurality of data mapping methods is then defined for each persistent object Then, a request to invoke one of the plurality of mapping methods is constructed. After which, one of the plurality of mapping methods for mapping the data structure between the object and the persistent medium is performed.

16 Claims, 4 Drawing Sheets

PERSISTENT OBJECT MAPPING SYSTEM AND METHOD WITH ABSTRACT SCHEMA MAPPER

This is a continuation of application Ser. No. 08/234,434, filed Apr. 26, 1994 and now abandoned.

CROSS-REFERENCE TO RELATED APPLICATION

The present application is related to U.S. patent application Ser. No. 08/234,435, entitled "Method And System For Optimizing Access To A Datastore" Attorney Docket No. AT9-94-048, filed of even date herewith by the inventors hereof, assigned to the assignee herein, and incorporated herein by reference.

The present application is related to U.S. patent application Ser. No. 08/018,893, entitled "Persistent Object Storage System With Customizable Class For I/O Formatting," Attorney Docket No. AT9-93-021 filed Feb. 17, 1993, U.S. patent application Ser. No. 08/018,608, entitled "Persistent Object Storage System With Modifiable Group Skeletal Formats," now abandoned, Attorney Docket No. AT9-93-018 filed Feb. 17, 1993, and U.S. patent application Ser. No. 08/077,348, entitled "Persistent Object Storage System With Default Object and Coder/Decoder," having Attorney Docket No. AT9-93-051, filed Jun. 14, 1993, each being assigned to the assignee herein, and all herein incorporated by reference for all purposes.

BACKGROUND OF THE INVENTION

1. Technical Field

The present invention relates in general to a method and system for mapping data between an active file and permanent storage, and in particular to a method and system for optimizing mapping data between objects and datastores in an object-oriented environment. Still more particularly, the present invention relates to a method and system for mapping between persistent objects and datastores in an object-oriented environment using the same system language.

2. Description of the Related Art

Object-oriented programing environments treat the presentation of data and its manipulation as a single entity called an "object", which is a package of information and the description of its manipulation. An object is manipulated by sending a "message" to the object. An object that receives a message determines how to manipulate itself. A "class" describes one or more related objects, and an "instance" of an object is an object described by a particular class. Each instance contains data in "instance variables". All instances in a class have the same instance variables although the actual values of the instance variables may differ. The class contains "methods", which are procedures that are invoked by sending messages to an instance of a class. All objects in a class have the same methods.

Inheritance is a feature of an object-oriented environment. Typically, object-oriented environments provide inheritance between classes. For example, a class may be modified to form a new class, wherein the original class is the "superclass" and the new class is called the "subclass", which inherits everything from the super class.

Another feature of an object-oriented environment is object persistence. An object can have a "dynamic state" and a "persistent state". In the dynamic state, an object is typically in memory and is not likely to exist for the entire lifetime of the object; e.g., the object would not survive a system failure. The persistent state of an object is the data that is used to reconstruct the dynamic state of an object. A standard for implementing object persistence has been set by Object Management Group, Inc. This standard is known as the Object Persistence Service Specification (OPSS), which defines a guidelines for providing interfaces and mechanisms used for retaining and managing the persistent state of objects. A client is an object that manipulates a persistent object.

OPSS defines a number of interfaces including: Persistent ID (PID), Persistent Object (PO), Persistent Object Manager (POM), Persistent Data Service (PDS), Protocol, and Datastore. The PID contains information that identifies the storage location for the persistent states of an object. The PO is an object whose persistence is typically controlled externally by its clients. The PO includes a store/restore interface defining the operations that control storing and restoring a PO's persistent data. The PDS implements a mechanism for making data persistent and manipulating the data. The POM handles the routing of store/restore methods from objects to PDSs. Protocol provides a mechanism to move data in and out of an object. A Datastore is an interface that provides one of several ways to store data into some persistent medium. A Datastore may be, for example, a database and may use well known interfaces for databases and record files. The Datastore provides storage for the persistent state of an object.

Additional information about object-oriented computing can be found in Peterson, Object Oriented Computing, IEEE Computer Society Press, IEEE Computer Society Press Order No. 821 (1990) and in De Champeaux, Object-Oriented System Development, Addison-Wesley Publishing Co. (1993). More information and details regarding the implementation of object persistence may be found in Object Persistence Service Specification, OMG TC document number 93.11.3, which is available from Object Management Group, Inc., located at 492 Old Connecticut Path, Framingham, Mass., 01701.

Under OPSS, a performance problem exists with mapping object data to Datastores. Importantly, as OMG specification does not define how a specialized PDS should be implemented, there is no standard for performing mapping. Accordingly, mapping languages, typically called Schema Mapping Languages, are used that allow a system programmer to describe the mapping between the object and the relational tables. There are, however, several problems with this approach. One problem is that the Schema Mapper language requires an interpreter to read and interpret the schema mappings. Another problem is that system programmers must learn another language, which is generally unlike either the object data access technology or the Datastore access process. Yet another problem is that Schema Mapper Interpreters are typically designed to support the mappings being used at the time the interpreter was designed. Therefore, it would be advantageous to have a method and system for mapping persistent objects to Datastores using the same languages used in general to get data in and out of datastore (e.g. SQL) and in general to get data in and out of objects (e.g., attribute access methods).

SUMMARY OF THE INVENTION

It is therefore one object of the present invention to provide a method and system for mapping data between an active file and permanent storage.

It is another object of the present invention to provide a method and system for optimizing mapping data between objects and datastores in an object-oriented environment.

It is yet another object of the present invention to provide a method and system for mapping between persistent objects and datastores in an object-oriented environment using the same system language.

The foregoing objects are achieved as is now described in a system for mapping data between a selected object and a persistent medium in an object-oriented computer system, with the data being manipulated by processing methods associated with the object. The system comprises a target selection means for selecting a target to which the data is to be mapped and environment invoking means for invoking an environment type in which the data is to be mapped, where both the target selection means and the environment invoking means are both responsive to a mapping request. The system further includes a method construction means for constructing a mapping method associated with the mapping request for mapping between the selected object and the persistent medium. The construction means is invoked upon the instantiation of a persistent object to perform any method selected from the method group of "store new", "store existing", "restore", and "delete".

Further, a method is disclosed for mapping a data structure between an object, which is in a class object, and a persistent medium in an object-oriented environment. The method includes the data processing system implemented steps of: receiving a request to map the data structure between the object and the persistent medium at the object; sending the request from the identification object to the class object in response to receiving the request; defining a plurality of data mapping methods for each persistent object; constructing a request to invoke one of the plurality of mapping methods based on the request to map the data structure; performing the invoked one of the plurality of mapping methods for mapping the data structure between the object and the persistent medium. The methods are from the same group of storing new data, storing existing data, restoring existing data, and deleting data.

The method of mapping the data structure in a new location within the persistent medium includes the steps of constructing a new location within the persistent medium for receiving the data structure; converting the data structure to an environment type compatible with the persistent medium; and storing the converted data structure in the new location within the persistent medium. The method of restoring the data structure mapped in an existing location within the persistent medium for mapping to the object and also includes the steps of recalling the data structure from a location within the persistent medium; converting the data structure to an environment type compatible with the object; storing the converted data structure in the object.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
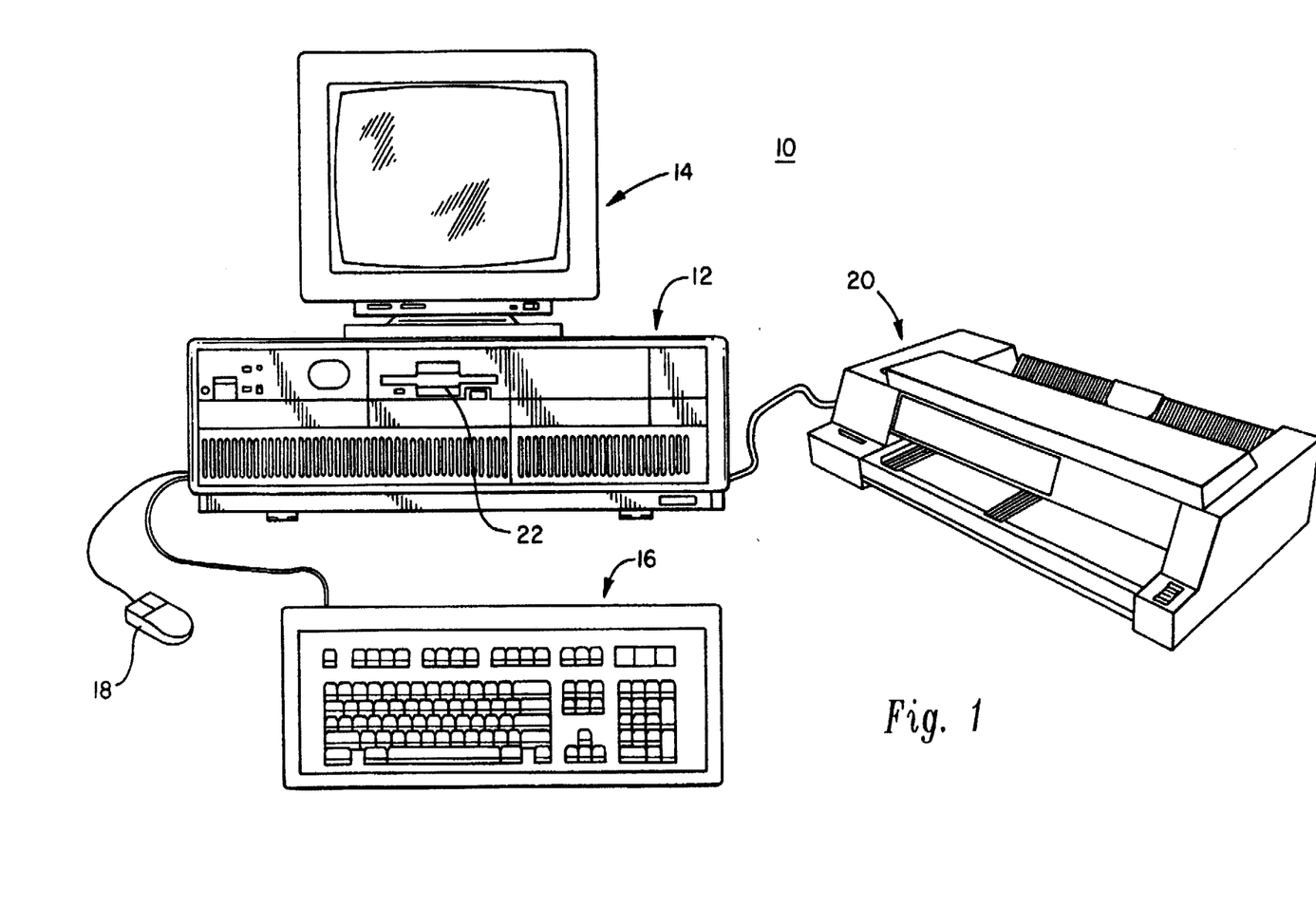
FIG. 1 depicts an illustration of a system in which the present invention operates.

Referring now to the figures, and in particular to FIG. 1, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
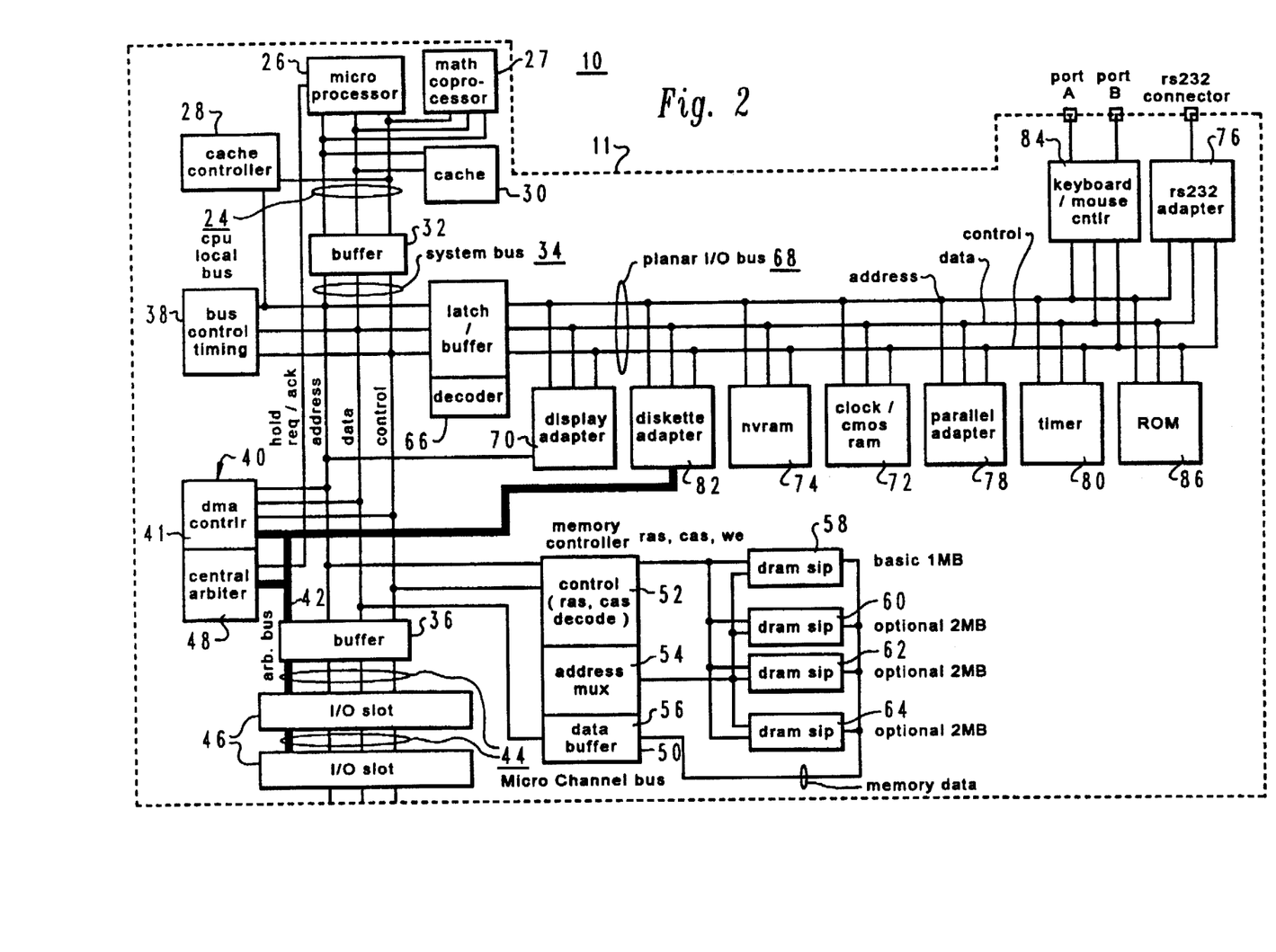
FIG. 2 is a block diagram of the system of FIG. 1.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to the I/O slots 46 and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the Pentium microprocessor, which is sold by Intel Corporation. "Pentium" is a trademark of Intel Corporation.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80386, or 80486 microprocessor. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46 for receiving Micro Channel adapter cards which may be further connected to an I/O device or memory. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
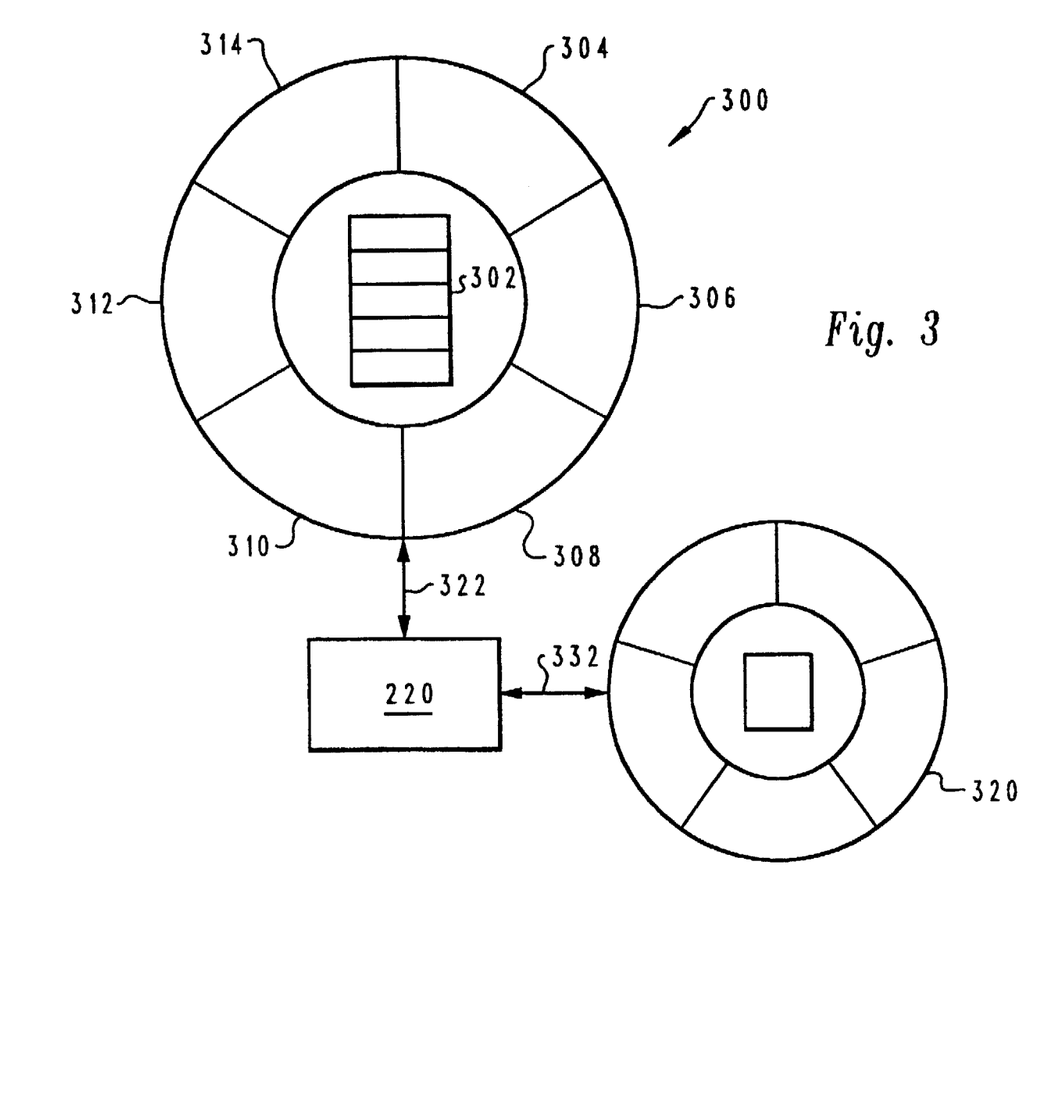
FIG. 3 depicts an object according to the present invention.

An object encapsulates data and the methods needed to operate on that data. Objects can be represented by a "doughnut diagram" such as shown in FIG. 3. Object data is shown in the center 302 surrounded by the applicable methods 304 to 314. Data 302 may be modified only by the methods of that object. Methods 304–314 are invoked by receiving messages from other objects. A typical object oriented system will have a message router 220 that routes messages between objects. Thus, object 300 causes Method C 308 to be invoked by sending a message 332 to the message router that in turn sends it 322 to Method C 308 of object 300. Object frameworks are constructed to provide a set of objects for application and system developers to use to construct a delivered system. The IBM System Object Model (SOM) framework, for example, provides a language independent set of objects for use in systems development. The IBM OS/2 Version 2.1 Workplace Shell is an example of an application developed using such an environment.

Objects are grouped into classes of related objects. The class description contains information relevant to all objects in a class, including a description of instance variables maintained by each of the objects and the available object methods. An object instance is created (or "instantiated") based on that information and has the properties defined in the object class. For example, the object class DOG can include the instance variables "dog_type" and "dog_name" and a "bark" method implementing the response to a bark message. An instance of dog, e.g. ROVER, will maintain the type and name instance variables for itself and will respond to the bark message.

Abstract classes are used to describe the interfaces and methods expected to be used by a class without providing detail on the implementation of those methods. Abstract classes are useful in frameworks where the implementation details are to be left to the implementor. Concrete classes are created as subclasses of abstract classes and implement those classes.

An AbstractSchemaMapper base class is implemented in the preferred embodiment to define the interfaces to concrete SchemaMapper subclasses derived by the system or application developer. The AbstractSchemaMapper class defines the interface to the following methods. SchemaMapperStoreNew maps a new location in the datastore as a destination for the object data. SchemaMapperStoreExisting maps an existing location in the datastore for the object data.

SchemaMapperRestore locates object data stored in the datastore, restores the object data in a form allowable for mapping in the Persistent object form, and maps the object data between the datastore and the Persistent object. SchemaMapperDelete deletes object data mapped between the Persistent object and the datastore.

The AbstractSchemaMapper is used by a programmer to define a mapping between a specific object and a persistent medium or datastore, such as, for example, a relational database, by implementing a specialization of the AbstractSchemaMapper interface. Each specialization implements each of the four AbstractSchemaMapper methods for a given class. This enables a PDS specialized for a particular datastore to route the data to be mapped to a specialized SchemaMapper used to map between that type of persistent object and the datastore. Since each specialized SchemaMapper has the same generic interface as the AbstractSchemaMapper, the specialized PDS need not know in advance which specialized SchemaMapper must be selected to map the data.

The structure of each method can be understood by reference to the following example of a specialized schema mapper. The example shows schema mapper specialized for mapping account objects (with attributes Account_Id, Branch_Id, and Account_Balance) and rows in a relational database table (with columns for Account identifier, Branch specification, and balance in the account):

```
STORE_NEW
    void *store_new(somSelf,ev,PO obj, xxxPID_DB2 PID)
    {
        EXEC SQL INCLUDE SQLCA;
        EXEC SQL BEGIN DECLARE SECTION;
            char AccountId[10];
            char BranchId[10];
            long AccountBalance;
        EXEC SQL END DECLARE SECTION;
        AccountId = ___get_AccountId(obj);
        BranchId = ___get_BranchId(obj);
        AccountBalance = ___get_AccountBalance(obj);
        EXEC SQL INSERT INTO ACCOUNT
        VALUES    (:AccountId,   :BranchId,
        :AccountBalance);
        return (&SQLCA);
    };
STORE_EXISTING
    void *store_existing(somSelf,ev,PO   obj,xxxPID_DB2
    PID)
    {
        EXEC SQL INCLUDE SQLCA;
        EXEC SQL BEGIN DECLARE SECTION;
            char AccountId[10];
            char BranchId[10];
            long AccountBalance;
        EXEC SQL END DECLARE SECTION;
        AccountId = ___get_AccountId(obj);
        AccountBalance = ___get_AccountBalance (obj);
        EXEC SQL UPDATE ACCOUNT
        SET ACCOUNTBALANCE = :AccountBalance
        WHERE ACCOUNTID = :AccountId
        return (&SQLCA);
    };
RESTORE
    void *restore(somSelf, ev, PO obj, xxxPID_DB2 PID)
    {
        EXEC SQL INCLUDE SQLCA;
        EXEC SQL BEGIN DECLARE SECTION;
            char AccountId[10];
            char BranchId[10];
            long AccountBalance;
        EXEC SQL END DECLARE SECTION;
        AccountId = ___get_string_item (PID); /* <— */
        EXEC SQL SELECT BRANCHID, ACCOUNTBALANCE
        INTO :BranchId :AccountBalance
        FROM ACCOUNT
        WHERE ACCOUNTID = :AccountId
        ___set_AccountId (somSelf, ev, AccountId);
        ___set_BranchId (somSelf, ev, BranchId);
        ___set_accountbalance    (somSelf,    ev,
        AccountBalance);
        return (&SQLCA);
    };
DELETE
    void *delete (somSelf, ev, PO obj, xxxPID_DB2 PID)
    {
        EXEC SQL INCLUDE SQLCA;
        EXEC SQL BEGIN DECLARE SECTION;
            char AccountId[10];
        EXEC SQL END DECLARE SECTION;
        AccountId = ___get_string_item (PID); /* <— */
        EXEC SQL DELETE FROM ACCOUNT
        WHERE ACCOUNTID = :AccountId
        return (&SQLCA);
    };
```

The PDS then locates an appropriate schema_mapper and invokes the necessary methods. Each method call includes target object, environmental, and destination information having the following preferred format:

For each concrete method:
1. the target on which the method is to be operated (some specialization of the abstract schema mapper class);
2. the environment in which the object data is generated;
3. the object whose data is being manipulated;
4. the persistent identifier (PID) for the object.

In a mapping method, such as the store_new, which is implemented as follows:

void *store_new(somSelf, ev, PO obja, xxxPID_DB2 PID)

SomSelf represents the specific schema mapper object; ev identifies the environment type in which the target must be converted in order to be mapped; PO obja represents the persistent object containing the data to be mapped; and xxxPID_DB2 PID represents the persistent identifier associated with the persistent object identifying the location of the persistent data.

Figure 4:
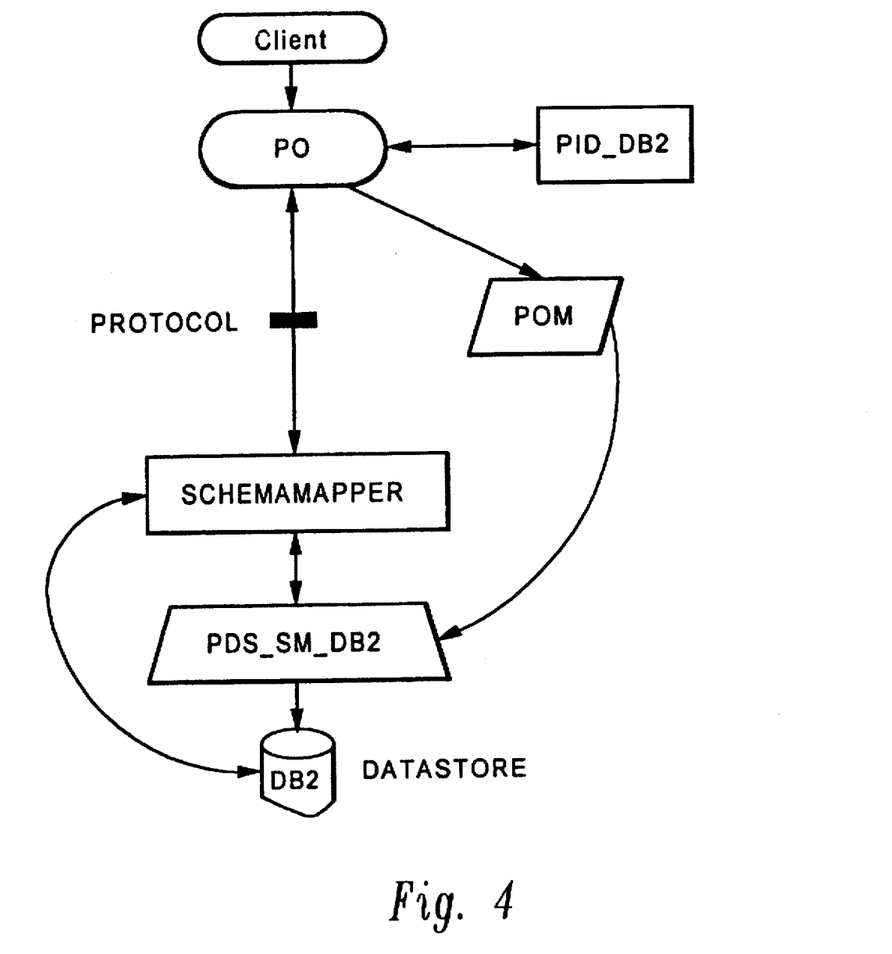
FIG. 4 is a block diagram of the hierarchial operating procedure of the SchemaMapper according to the present invention.

An hierarchial flowchart of operation using the AbstractSchemaMapper to map data between a persistent object (PO) and a datastore, such as, for example DB2, is illustrated in FIG. 4. A client sets up a persistent object PO and gives it a persistent identifier (PID). The client then initiates a store/restore request on an object. The request is passed from the PO onto the persistent object manager (POM). Next, the POM routes the request to the persistent data service (PDS). The PDS is accessed based on the PID and the object type of the destination persistent medium. There is a PDS associated with each persistent medium and the PDS acts as a neutral interface between the client and the data store. This means that the PDS understands the operations of the underlying datastore. The schemamapper used to map between an object and some datastore, which, in this example, is for a SchemaMapper for a DB2 persistent medium. The SchemaMapper then serves to provide mapping between the object data (PO) and the datastore.

While the invention has been particularly shown and described with reference to a preferred embodiment, it will be understood by those skilled in the art that various changes in form and detail may be made therein without departing from the spirit and scope of the invention.

What is claimed is:

1. A data processing system for mapping data between a dynamic state and a persistent state of a persistent object, wherein said dynamic state exists within a first environment and said persistent state exists within one of a plurality of persistent media, and further wherein said one of a plurality of persistent media exists within a second environment, comprising:

means for associating said persistent object with at least one of said plurality of persistent media;

means for constructing a mapping method for each of said plurality of persistent media associated with said persistent object, in response to said persistent object and said first and second environments, wherein each said constructed mapping method includes language usable by a type of said each of said plurality of persistent media; and means for mapping data between a dynamic state and a persistent state of a persistent object utilizing said mapping method constructing means, wherein said dynamic state exists within a first environment and said persistent state exists within said at least one of said plurality of persistent media, and further wherein said at least one of said plurality of persistent media exists within a second environment.

2. The system of claim 1, wherein said means for constructing a mapping method is invoked upon the instantiation of a persistent object.

3. The system of claim 1, wherein said constructed mapping method comprises a "store new" method.

4. The system of claim 1, wherein said constructed mapping method comprises a "store existing" method.

5. The system of claim 1, wherein said constructed mapping method comprises a "restore" method.

6. The system of claim 1, wherein said constructed mapping method comprises a "delete" method.

7. A data processing system as set forth in claim 1, said mapping method constructing means further comprising:

means for defining a mapping class having a generic interface and a mapping method, for each of said plurality of persistent media associated with said persistent object;

means for adapting said mapping method within each said mapping class for said persistent object; and means for instantiating a mapping object belonging to each said mapping class such that said adapted mapping method may be invoked utilizing said generic interface.

8. The data processing system of claim 1, wherein said at least one of said plurality of persistent media comprises a relational database and further wherein said language usable by a type of said each of said plurality of persistent media comprises a structured query language.

9. A method within a data processing system of mapping data between a dynamic state and a persistent state of a persistent object, wherein said dynamic state exists within a first environment and said persistent state exists within one of a plurality of persistent media, and further wherein said one of a plurality of persistent media exists within a second environment, said method comprising the steps of:

associating said persistent object with at least one of said plurality of persistent media;

constructing a mapping method for each of said plurality of persistent media associated with said persistent object, in response to said persistent object and said first and second environments, wherein each said constructed mapping method includes language usable by a type of said each of said plurality of persistent media; and mapping data between a dynamic state and a persistent state of a persistent object utilizing said constructed mapping method, wherein said dynamic state exists within a first environment and said persistent state exists within said at least one of said plurality of persistent media, and further wherein said at least one of said plurality of persistent media exists within a second environment.

10. The method of claim 9, wherein said mapping method includes a method of mapping said data in a new location within one of said plurality of persistent media said method further comprising the steps of:

constructing a new location within a persistent medium for receiving said data;

converting said data in response to an environment type compatible with said persistent medium; and storing said converted data in said new location within said persistent medium.

11. The method of claim 9, wherein said mapping method includes a method of mapping said data in an existing location within one of said plurality of persistent media, said method further comprising the steps of:

converting said data in response to an environment type compatible with a persistent medium; and storing said converted data in said existing location within said persistent medium.

12. The method of claim 9, wherein said mapping method includes a method of restoring said data mapped in an existing location within one of said plurality of persistent media to said persistent object, said method further comprising the steps of:

recalling said data from a location within a persistent medium;

converting said data to an environment type compatible with said persistent object; and storing said converted data in said persistent object.

13. The method of claim 9, wherein said mapping method includes a method of deleting said data from an existing location within one of said plurality of persistent media, said method further comprising the step of:

deleting said data from said existing location within a persistent medium.

14. A method as set forth in claim 9, said step of constructing a mapping method further comprises the steps of:

defining a mapping class having a generic interface and a mapping method, for each of said plurality of persistent media associated with said persistent object;

adapting said mapping method within each said mapping class for said persistent object; and instantiating a mapping object belonging to each said mapping class such that said adapted mapping method may be invoked utilizing said generic interface.

15. A computer program product to be utilized within a data processing system for mapping data between a dynamic state and a persistent state of a persistent object, wherein said dynamic state exists within a first environment and said persistent state exists within one of a plurality of persistent media, and further wherein said one of a plurality of persistent media exists within a second environment, comprising:

media usable by said data processing system for storing and executing instruction means;

instruction means, embodied within said media, for associating said persistent object with at least one of said plurality of persistent media;

instruction means, embodied within said media, for constructing a mapping method for each of said plurality of persistent media associated with said persistent object, in response to said persistent object and said first and second environments, wherein each said constructed mapping method includes language usable by a type of said each of said plurality of persistent media; and instruction means, embodied within said media, for mapping data between a dynamic state and a persistent state of a persistent object utilizing said mapping method constructing instruction means, wherein said dynamic state exists within a first environment and said persistent state exists within said at least one of said plurality of persistent media, and further wherein said at least one of said plurality of persistent media exists within a second environment.

16. A computer program product as set forth in claim 15, said mapping method constructing instruction means further comprising:

instruction means, embodied within said media, for defining a mapping class having a generic interface and a mapping method, for each of said plurality of persistent media associated with said persistent object;

instruction means, embodied within said media, for adapting said mapping method within each said mapping class for said persistent object; and instruction means, embodied within said media, for instantiating a mapping object belonging to each said mapping class such that said adapted mapping method may be invoked utilizing said generic interface.

* * * * *